US 12,554,275 B2

(12) United States Patent
Yamawaki et al.

(10) Patent No.: US 12,554,275 B2
(45) Date of Patent: Feb. 17, 2026

(54) TEMPERATURE-CONTROLLED FLUID CIRCULATION APPARATUS AND TEMPERATURE-CONTROLLED FLUID CIRCULATION SYSTEM

(71) Applicant: SHINWA CONTROLS CO., LTD, Kawasaki (JP)

(72) Inventors: Masakatsu Yamawaki, Kawasaki (JP); Teiichirou Ueda, Kawasaki (JP); Katsutoshi Sakai, Kawasaki (JP); Shuya Matsubayashi, Kawasaki (JP)

(73) Assignee: Shinwa Controls Co., Ltd., Kawasaki (JP)

( * ) Notice: Subject to any disclaimer, the term of this patent is extended or adjusted under 35 U.S.C. 154(b) by 280 days.

(21) Appl. No.: 18/248,554

(22) PCT Filed: Oct. 22, 2021

(86) PCT No.: PCT/JP2021/039068
§ 371 (c)(1),
(2) Date: Apr. 11, 2023

(87) PCT Pub. No.: WO2022/091961
PCT Pub. Date: May 5, 2022

(65) Prior Publication Data
US 2023/0376054 A1 Nov. 23, 2023

(30) Foreign Application Priority Data
Oct. 30, 2020 (JP) .................... 2020-182848

(51) Int. Cl.
*G05D 23/19* (2006.01)
*G05D 16/20* (2006.01)

(52) U.S. Cl.
CPC ....... *G05D 16/2024* (2019.01); *G05D 16/204* (2013.01); *G05D 23/1917* (2013.01)

(58) Field of Classification Search
CPC ............. G05D 16/204; G05D 16/2024; G05D 23/1917
See application file for complete search history.

(56) References Cited

U.S. PATENT DOCUMENTS

2017/0012310 A1* 1/2017 Han .................. H01M 8/04037

FOREIGN PATENT DOCUMENTS

| CN | 106335385 A | 1/2017 |
|---|---|---|
| JP | 2013-105359 A | 5/2013 |
| JP | 2014-145565 A | 8/2014 |

OTHER PUBLICATIONS

English translation of the International Preliminary Report on Patentability (Chapter I) dated May 11, 2023 (Application No. PCT/JP2021/039068).

(Continued)

*Primary Examiner* — Jonathan Bradford
(74) *Attorney, Agent, or Firm* — BURR PATENT LAW, PLLC (57) ABSTRACT

A temperature-controlled fluid circulation apparatus includes a flow path through which a fluid controlled by a temperature control unit is circulated via a fluid supply target; a three-way valve in the flow path downstream of the fluid supply target and upstream of a temperature control position by the temperature control unit, a part between two out of three ports constituting a part of the flow path; and a bypass flow path branching from the flow path downstream of the temperature control position by the temperature control unit and upstream of the fluid supply target, to be connected to one remaining port out of the three ports of the three-way valve. A pressure of the fluid flowing through the flow path at a position that is downstream of the fluid supply target and upstream of the three-way valve is detected by a pressure sensor.

12 Claims, 4 Drawing Sheets (56) References Cited

OTHER PUBLICATIONS

International Search Report and Written Opinion (Application No. PCT/JP2021/039068) dated Dec. 14, 2021.

* cited by examiner

TEMPERATURE-CONTROLLED FLUID CIRCULATION APPARATUS AND TEMPERATURE-CONTROLLED FLUID CIRCULATION SYSTEM

FIELD OF THE INVENTION

An embodiment of the present invention relates to a temperature-controlled fluid circulation apparatus and a temperature-controlled fluid system that sends a temperature-controlled fluid to a fluid supply target or a temperature control target, and again controls a temperature of the fluid having passed through the fluid supply target or the temperature supply target.

BACKGROUND ART

A fluid circulation apparatus is known, which sends, to a temperature control target, a fluid such as a brine whose temperature has been controlled by a refrigeration apparatus having a compressor, a condenser, an expansion valve and an evaporator, and again controls a temperature of the fluid having passed through the temperature control target by the refrigeration apparatus (for example, JP 2014-145565 A).

A system comprising a plurality of fluid circulation apparatuses as described above is disclosed in JP 2013-105359 A. In the system of JP 2013-105359 A, fluids whose temperatures are controlled by two fluid circulation apparatuses have temperatures different from each other, and the fluids, which are to be sent by the two fluid circulation apparatuses to a temperature control target, can be mixed with each other just before (in front of) the temperature control target. This allows a temperature of the fluid sent to the temperature control target to be quickly adjusted to a desired temperature.

SUMMARY OF THE INVENTION

In the fluid circulation apparatus as described above, a temperature of the fluid returning from the temperature control target may largely change depending on a condition of the temperature control target, for example. As a result, a pressure of the fluid downstream of the temperature control target may largely change. Such pressure change may affect a flowing condition of the fluid upstream of the temperature control target. This may disturb the flowing condition of the fluid to thereby lower the precision in temperature control.

In the system disclosed in Patent Document 2 (JP2013-105359A), the fluid returning from the temperature control target is distributed to two fluid circulation apparatuses that control the fluid to have temperatures different from each other. In this case, effects given by the pressure of the fluid returning from the temperature control target on the two fluid circulation apparatuses may differ from each other. In this case, a ratio of the fluids to be mixed with each other just before (in front of) the temperature control target may largely deviate from a target value, which may significantly impair the precision in temperature control.

The present invention has been made in view of the above circumstances. The object of the present invention is to provide a temperature-controlled fluid circulation apparatus and a temperature-controlled fluid circulation system which are capable of improving the precision in temperature control by a fluid by improving the stability of a circulation condition of the fluid.

A temperature-controlled fluid circulation apparatus according to one embodiment of the present invention comprises: a flow path through which a fluid whose temperature has been controlled by a temperature control unit is circulated via a fluid supply target; a three-way valve located in the flow path at a position that is downstream of the fluid supply target and upstream of a temperature control position by the temperature control unit, a part between two ports out of three ports constituting a part of the flow path; a bypass flow path branching from the flow path at a position that is downstream of the temperature control position by the temperature control unit and upstream of the fluid supply target, to be connected to one remaining port out of the three ports of the three-way valve, the one remaining port being other than the two ports that constitute the part of the flow path; a pressure sensor that detects a pressure of the fluid flowing through the flow path at a position that is downstream of the fluid supply target and upstream of the three-way valve; and a controller that controls the three-way valve. The controller controls an opening degree of the three-way valve in such a manner that the pressure of the fluid, which is detected by the pressure sensor, becomes a specified target pressure.

In addition, a temperature-controlled fluid circulation system according to one embodiment of the present invention comprises: a valve unit; a first temperature-controlled fluid circulation apparatus comprising: a first-side flow path through which a fluid whose temperature has been controlled by a first-side temperature control unit is circulated via the valve unit; a first-side three-way valve located in the first-side flow path at a position that is downstream of the valve unit and upstream of a temperature control position by the first-side temperature control unit, a part between two ports out of three ports constituting a part of the first-side flow path; a first-side bypass flow path branching from the first-side flow path at a position that is downstream of the temperature control position by the first-side temperature control unit and upstream of the valve unit, to be connected to one remaining port out of the three ports of the first-side three-way valve, the one remaining port being other than the two ports that constitute a part of the first-side flow path; and a first-side pressure sensor that detects a pressure of the fluid flowing through the first-side flow path at a position that is downstream of the valve unit and upstream of the first-side three-way valve; a second temperature-controlled fluid circulation apparatus comprising: a second-side flow path through which a fluid whose temperature has been controlled by a second-side temperature control unit is circulated via the valve unit; a second-side three-way valve located in the second-side flow path at a position that is downstream of the valve unit and upstream of a temperature control position by the second-side temperature control unit, a part between two ports out of three ports constituting a part of the second-side flow path; a second-side bypass flow path branching from the second-side flow path at a position that is downstream of the temperature control position by the second-side temperature control unit and upstream of the valve unit, to be connected to one remaining port out of the three ports of the second-side three-way valve, the one remaining port being other than the two ports that constitute a part of the second-side flow path; and a second-side pressure sensor that detects a pressure of the fluid flowing through the second-side flow path at a position that is downstream of the valve unit and upstream of the second-side three-way valve; and a controller that controls the first-side three-way valve and the second-side three-way valve.

The valve unit is configured to send, to a temperature control target, the fluid received from the first temperature-controlled fluid circulation apparatus, the fluid received from the second temperature-controlled fluid circulation apparatus, or the mixed fluid of the fluid received from the first temperature-controlled fluid circulation apparatus and the fluid received from the second temperature-controlled fluid circulation apparatus, and is configured to return the fluid having passed through the temperature control target to the first-side flow path or/and the second-side flow path. The controller controls an opening degree of the first-side three-way valve in such a manner that the pressure of the fluid, which is detected by the first-side pressure sensor, becomes a specified first-side target pressure, and controls an opening degree of the second-side three-way valve in such a manner that the pressure of the fluid, which is detected by the second-side pressure sensor, becomes a specified second-side target pressure.

The embodiments of the present invention can improve the precision in temperature control by a fluid by improving the stability of a circulation condition of the fluid.

DETAILED DESCRIPTION OF THE INVENTION

Respective embodiments of the present invention will be described herebelow.

First Embodiment

Figure 1:
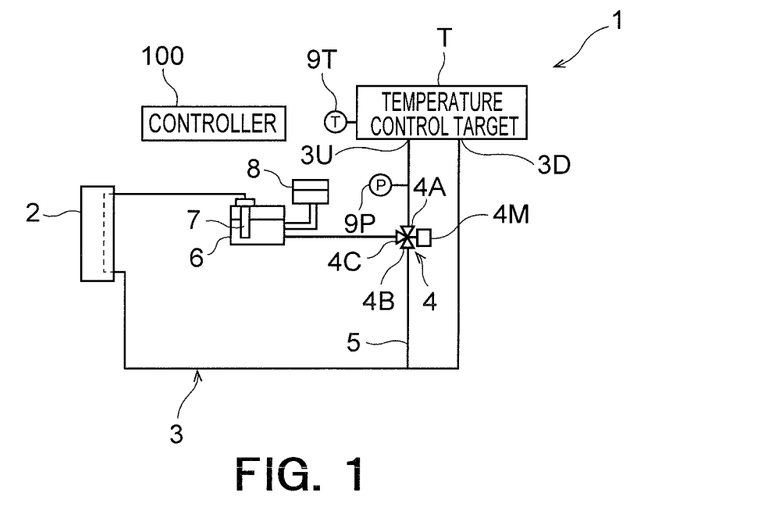
FIG. 1 is a view showing a schematic structure of a temperature-controlled fluid circulation apparatus according to a first embodiment of the present invention.

FIG. 1 is a view showing a schematic structure of a temperature-controlled fluid circulation apparatus 1 according to a first embodiment of the present invention. The temperature-controlled fluid circulation apparatus 1 comprises a flow path 3 through which a fluid whose temperature has been controlled by a temperature control unit 2 is circulated via a temperature control target T which is a fluid supply target. The temperature control unit 2 is an evaporator of a refrigerator, by way of example, but may be another cooling device. When the temperature control target T is heated, the temperature control unit 2 may be an electric heater, for example.

A fluid circulated through the flow path 3 is a brine, for example, but may be another fluid such as water. The flow path 3 in this embodiment has an upstream end 3U and a downstream end 3D which are respectively connected to the temperature control target T. The fluid whose temperature has been controlled by the temperature control unit 2 is supplied from the downstream end 3D of the flow path 3 to the temperature control target T, and the fluid having passed through the temperature control target T returns from the upstream end 3U of the flow path 3 into the flow path 3.

A three-way valve 4 is located in the flow path 3 at a position that is downstream of the temperature control target T and upstream of a temperature control position by the temperature control unit 2. The three-way valve 4 has a first port 4A, a second port 4B, and a third port 4C. A part between the first port 4A and the third port 4C constitutes a part of the flow path 3.

A bypass flow path 5 is connected to the second port 4B of the three-way valve 4. The bypass flow path 5 branches from the flow path 3 at a position that is downstream of the temperature control position by the temperature control unit 2 and upstream of the temperature control target T.

The three-way valve 4 is a proportional three-way valve, and has a stepping motor 4M serving as an actuator for driving a valve disk. The three-way valve 4 adjusts a position of the valve disk, not shown, by the stepping motor 4M, so as to change, based on the position of the valve disk, a ratio between a flow rate of the fluid flowing from the first port 4A to the third port 4C and a flow rate of the fluid flowing from the second port 4B to the third port 4C.

When the first port 4A and the third port 4C are connected at full open, all the fluid whose temperature has been controlled by the temperature control unit 2 flows toward the temperature control target T, and no fluid is bypassed by the bypass flow path 5 so as not to pass through the temperature control target T. On the other hand, when the second port 4B and the third port 4C are connected at a full open position, the fluid whose temperature has been controlled by the temperature control unit 2 does not flow through the temperature control target T and is bypassed by the bypass flow path 5 without passing through the temperature control target T.

A tank 6 is located in the flow path 3 at a position that is downstream of the three-way valve 4 and upstream of the temperature control position by the temperature control unit 2. The tank 6 also constitutes a part of the flow path 3. The tank 6 is configured to store a certain amount of fluid. In this embodiment, a pump 7 that imparts a driving force for circulating the fluid through the flow path 3 is located in the tank 6. In this embodiment, when an operation of the temperature-controlled fluid circulation apparatus 1 is started, the pump 7 is driven by a constant driving force.

In this embodiment, the fluid is a liquid. A liquid-level maintenance mechanism 8 that maintains constant a liquid level of the fluid, which is a liquid stored in the tank 6, is connected to the tank 6. In this embodiment, the liquid-level maintenance mechanism 8 is a container that stores a certain amount of liquid (the same liquid as a liquid which is the fluid to be circulated). A pipe member connected to a liquid level storage position in the container is connected to a liquid level storage position in the tank 6. The liquid level storage position is a position that is below a liquid level when a predetermined amount of liquid is stored in the tank 6 or the aforementioned container. An amount of liquid to be stored in the tank 6 or the aforementioned container is predetermined.

When a pressure of the fluid upstream of the tank 6 increases so that a liquid level of the tank 6 is going to increase, the liquid-level maintenance mechanism 8 sends the liquid in the tank to the liquid-level maintenance mechanism 8. On the other hand, when a pressure of the fluid upstream of the tank 6 decreases so that a liquid level of the tank 6 is going to decrease, the liquid-level maintenance mechanism 8 causes the liquid to flow from the liquid-level maintenance mechanism 8 into the tank 6. In this manner, the liquid-level maintenance mechanism 8 has a function for maintaining constant the liquid level of the tank 6, to thereby reduce pressure change of a part of the flow path 3, which is upstream of the tank 6.

In addition, the temperature-controlled fluid circulation apparatus 1 comprises a pressure sensor 9P, a temperature sensor 9T, and a controller 100 electrically connected to these sensors. The pressure sensor 9P detects a pressure of the fluid flowing through the flow path 3 at a position that is downstream of the temperature control target T and upstream of the three-way valve 4. The temperature sensor 9T detects a temperature of the temperature control target T.

The controller 100 may be formed of a computer having a CPU, ROM, etc., for example. In this case, various processes are performed in accordance with a program stored in the ROM. Alternatively, the controller 100 may be formed of another processor and an electric circuit (for example, FPGA (Field Programmable Gate Alley), etc.).

The controller 100 receives, from the pressure sensor 9P, information related to a pressure of the fluid, and receives, from the temperature sensor 9T, information related to a temperature of the temperature control target T. Based on the received information, the controller 100 controls an opening degree of the three-way valve 4 in such a manner that the pressure of the fluid, which is detected by the pressure sensor 9P, becomes a specified target pressure. The target pressure is inputted to the controller 100 by a user.

In more detail, the controller 100 in this embodiment is configured to perform feedback control of the opening degree of the three-way valve 4 in such manner that the pressure of the fluid, which is detected by the pressure sensor 9P, becomes the target pressure, based on a difference between the pressure detected by the pressure sensor 9P and the target pressure, and is configured to perform feed-forward control of the opening degree of the three-way valve 4 based on the temperature information from the temperature sensor 9T.

The aforementioned feed-forward control is performed when an absolute value of a rate of change in temperature of the temperature control target T is determined to become a threshold value or more. The feed-forward control changes the opening degree of the three-way valve 4 with a manipulated variable corresponding to a magnitude of the absolute value of the rate of change.

In more detail, when an absolute value of the rate of change in temperature of the temperature control target T becomes a temperature increase side threshold value or more, the opening degree of the three-way valve 4 is changed with a manipulated variable corresponding to a magnitude of the absolute value of the rate of change, in such a manner that the opening degree between the first port 4A and the third port 4C increases. On the other hand, when an absolute value of the rate of change in temperature of the temperature control target T becomes a temperature decrease side threshold value or more, the three-way valve 4 is operated with a manipulated variable corresponding to a magnitude of the absolute value of the rate of change, in such a manner that the opening degree between the first port 4A and the third port 4C decreases.

The aforementioned rate of change in temperature means an amount of change of temperature per unit time. The rate of change in temperature is sequentially calculated by calculating a moving average value of temperature for each unit time, and by dividing a difference between the moving average value of the latest temperature and the moving average value of temperature calculated one time before by the unit time. A time range for calculating the moving average value may be a time range that is a unit time back from a timing for calculating a rate of change, for example. It is desirable for the temperature sensor 9T to detect at least five temperatures within a time range during which the moving average value is calculated.

A duration of the unit time is not particularly limited. However, an excessively short unit time may reduce the precision of calculating a rate of change due to noise components. On the other hand, an excessively long unit time may interfere effective feed-forward control. Thus, a time interval (unit time) defining a rate of change may be set between 0.5 seconds and 3 seconds, for example.

Figure 2:
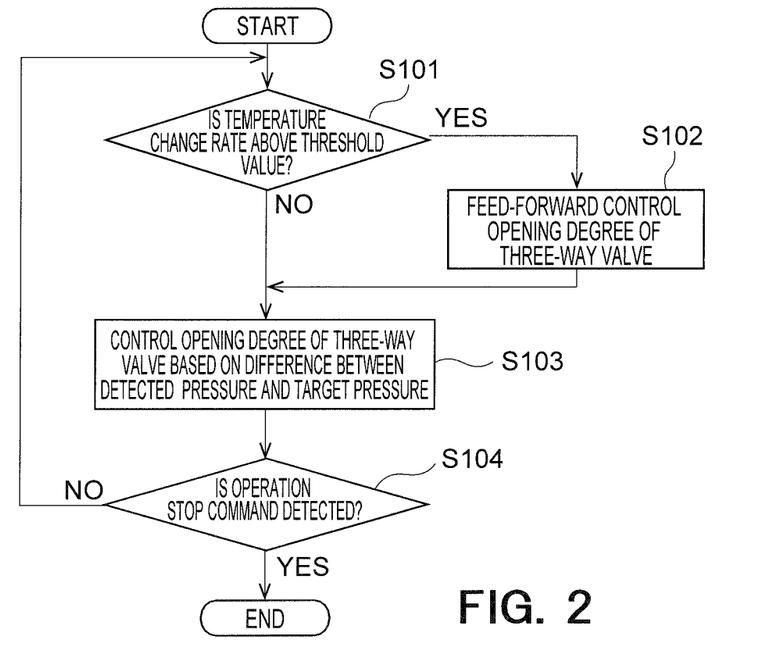
FIG. 2 is a flowchart illustrating an example of an operation of the temperature-controlled fluid circulation apparatus according to the first embodiment.

FIG. 2 is a flowchart illustrating an example of an operation of the temperature-controlled fluid circulation apparatus 1. The example of the operation of the temperature-controlled fluid circulation apparatus 1 is described herebelow with reference to FIG. 2.

The example described herein is started, for example, after the operation of the temperature-controlled fluid circulation apparatus 1 had been started so that a temperature of the temperature control target T has reached a target temperature. At this time, the three-way valve 4 is controlled to a predetermined standard opening degree. The standard opening degree is an intermediate opening degree between full close and full open. For example, when the temperature sensor 9T detects that the temperature of the temperature control target T has reached the target temperature, the controller 100 first checks, in a step 101, whether an absolute value of a rate of change in temperature (temperature change rate herebelow) of the temperature control target T becomes a threshold value or more, based on the information from the temperature sensor 9T.

When the step S101 determines that the absolute value of the temperature change rate becomes the threshold value or more, the controller 100 changes, in a step S102, the opening degree of the three-way valve 4 with a manipulated variable corresponding to a magnitude of the absolute value of the temperature change rate. Thereafter, the controller 100 causes the process to proceed to a step S103. On the other hand, when the step S101 does not determine that the absolute value of the temperature change rate becomes the threshold value or more, the process proceeds to the step S103.

In the step S103, the controller 100 performs feedback control of the opening degree of the three-way valve 4 based on a difference between the pressure detected by the pressure sensor 9P and the target pressure, in such a manner that the pressure detected by the pressure sensor 9P becomes the specified target pressure. Then, in a step S104, the controller 100 detects whether an operation stop command is generated. When the operation stop command is detected, the controller 100 stops the operation of the temperature-controlled fluid circulation apparatus 1. When the operation stop command is not detected, the controller 100 causes the process to return to the step S101.

In the aforementioned embodiment, the pressure of the fluid flowing out from the temperature control target T can be maintained at a desired value. This can improve the precision in temperature control by the fluid by improving the stability of a circulation condition of the fluid in the flow path 3.

In particular, combination of the feedback control to a target pressure based on the pressure sensor 9P and the feed-forward control based on a rate of change in temperature of the temperature control target T can improve reliability and rapidity of control to the target pressure. In addition, since the liquid level of the tank 6 is maintained by the liquid-level maintenance mechanism 8, pressure change of an upstream part of the tank 6 in the flow path 3, i.e., pressure change of the fluid flowing out from the temperature control target T is reduced. This can improve the stability of the fluid circulation condition using a simple mechanical configuration, to thereby improve the reliability of the apparatus.

Second Embodiment

Figure 3:
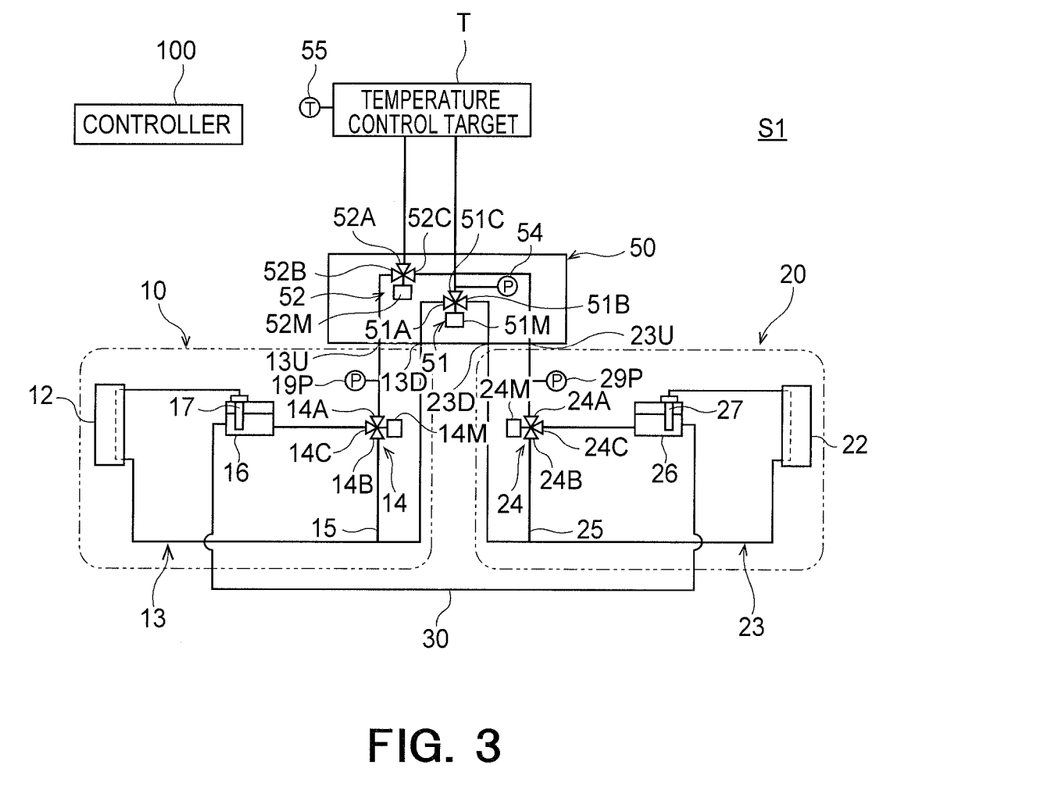
FIG. 3 is a view showing a schematic structure of a temperature-controlled fluid circulation system according to a second embodiment of the present invention.

Next, a temperature-controlled fluid circulation system S1 according to a second embodiment is described. FIG. 3 is a schematic view of the temperature-controlled fluid circulation system S1. The same symbols are given to parts of this embodiment that are similar to those of the first embodiment.

The temperature-controlled fluid circulation system S1 comprises a first temperature-controlled fluid circulation apparatus 10, a second temperature-controlled fluid circulation apparatus 20, a valve unit 50, and a controller 100.

In FIG. 3, main parts of the first temperature-controlled fluid circulation apparatus 10 and the second temperature-controlled fluid circulation apparatus 20 are respectively surrounded by two-dot chain lines. The first temperature-controlled fluid circulation apparatus 10 and the second temperature-controlled fluid circulation apparatus 20 each have a structure which is basically the same as that of the temperature-controlled fluid circulation apparatus 1 according to the first embodiment. The first temperature-controlled fluid circulation apparatus 10 and the second temperature-controlled fluid circulation apparatus 20 are described first herebelow.

The first temperature-controlled fluid circulation apparatus 10 comprises a first-side flow path 13 through which a fluid whose temperature has been controlled by a first-side temperature control unit 12 is circulated via the valve unit 50 which is a fluid supply target. The first-side temperature control unit 12 is an evaporator of a refrigerator, for example, but may be another cooling device.

A fluid circulated through the first-side flow path 13 is a brine, for example, but may be another fluid such as water. The first-side flow path 13 in this embodiment has an upstream end 13U and a downstream end 13D which are respectively connected to the valve unit 50. The fluid whose temperature has been controlled by the first-side temperature control unit 12 is supplied from the downstream end 13D of the first-side flow path 13 to the valve unit 50. The valve unit 50 supplies the received fluid to a temperature control target T, which will be described in detail below. In this embodiment, the fluid flowing out from the temperature control target T can be returned from the upstream end 13U into the first-side flow path 13 via the valve unit 50. However, in this example, when the fluid from the first temperature-controlled fluid circulation apparatus 10 is not allowed to flow into the temperature control target T via the valve unit 50, the fluid from the temperature control target T does not return into the first-side flow path 13 via the valve unit 50.

A first-side three-way valve 14 is located in the first-side flow path 13 at a position that is downstream of the valve unit 50 and upstream of a temperature control position by the first-side temperature control unit 12. The first-side three-way valve 14 has a first-side first port 14A, a first-side second port 14B and a first-side third port 14C. A part between the first-side first port 14A and the first-side third port 14C constitutes a part of the first-side flow path 13.

A first-side bypass flow path 15 is connected to the first-side second port 14B of the first-side three-way valve 14. The first-side bypass flow path 15 branches from the first-side flow path 13 at a position that is downstream of the temperature control position by the first-side temperature control unit 12 and upstream of the valve unit 50.

The first-side three-way valve 14 is a proportional three-way valve, and has a first-side stepping motor 14M serving as an actuator for driving a valve disk. The first-side three-way valve 14 adjusts a position of the valve disk, not shown, by the first-side stepping motor 14M, so as to change, based on the position of the valve disk, a ratio between a flow rate of the fluid flowing from the first-side first port 14A to the first-side third port 14C and a flow rate of the fluid flowing from the first-side second port 14B to the first-side third port 14C.

A first-side tank 16 is located in the first-side flow path 13 at a position that is downstream of the first-side three-way valve 14 and upstream of the temperature control position by the first-side temperature control unit 12. The first-side tank 16 also constitutes a part of the first-side flow path 13. The first-side tank 16 stores a certain amount of fluid which is a liquid. In this embodiment, a first-side pump 17 that imparts a driving force for circulating the fluid through the first-side flow path 13 is located in the first-side tank 16. In this embodiment, when an operation of the temperature-controlled fluid circulation system S1 is started, the first-side pump 17 is driven by a constant driving force.

In addition, the first temperature-controlled fluid circulation apparatus 10 comprises a first-side pressure sensor 19P. The first-side pressure sensor 19P is electrically connected to a controller 100. The first-side pressure sensor 19P detects a pressure of the fluid flowing through the first-side flow path 13 at a poison that is downstream of the valve unit 50 and upstream of the first-side three-way valve 14.

Next, the second temperature-controlled fluid circulation apparatus 20 also comprises a second-side flow path 23 through which a fluid whose temperature has been controlled by a second-side temperature control unit 22 is circulated via the valve unit 50 which is a fluid supply target. The second temperature control unit 22 is also an evaporator of a refrigerator, for example, but may be another cooling device. Note that the second-side temperature-controlled fluid circulation apparatus 20 cools a fluid to a lower temperature than the first-side temperature-controlled fluid circulation apparatus 10. Namely, in this embodiment, the temperature-controlled fluid circulation system S1 is operated in such a manner that a temperature of the fluid which is controlled by the first temperature-controlled fluid circulation apparatus 10 is higher than a temperature of the fluid which is controlled by the second temperature-controlled fluid circulation apparatus 20.

A fluid circulated through the second-side flow path 23 is the same fluid as the fluid circulated through the first-side flow path 13. The fluid is a brine, for example, but may be another fluid such as water. The second-side flow path 23 in this embodiment also has an upstream end 23U and a downstream end 23D which are respectively connected to the valve unit 50. The fluid whose temperature has been controlled by the second-side temperature control unit 22 is supplied from the downstream end 23D of the second-side flow path 23 to the valve unit 50. Then, as described above, in this embodiment, the valve unit 50 supplies the received fluid to the temperature control target T. Then, similarly to the above, the fluid flowing out from the temperature control target T can be returned from the upstream end 23U into the second-side flow path 23 via the valve unit 50. However, when the fluid from the second temperature-controlled fluid circulation apparatus 20 is not allowed to flow into the temperature control target T via the valve unit 50, the fluid from the temperature control target T does not return into the second-side flow path 23 via the valve unit 50.

A second-side three-way valve 24 is also located in the second-side flow path 23 at a position that is downstream of the valve unit 50 and upstream of a temperature control position by the second-side temperature control unit 22. The second-side three-way valve 24 has a second-side first port 24A, a second-side second port 24B and a second-side third port 24C. A part between the second-side first port 24A and the second-side third port 24C constitutes a part of the second-side flow path 23.

A second-side bypass flow path 25 is connected to the second-side second port 24B of the second-side three-way valve 24. The second-side bypass flow path 25 branches from the second-side flow path 23 at a position that is downstream of the temperature control position by the second-side temperature control unit 22 and upstream of the valve unit 50.

The second-side three-way valve 24 is a proportional three-way valve, and has a second-side stepping motor 24M serving as an actuator for driving a valve disk. The second-side three-way valve 24 adjusts a position of the valve disk, not shown, by the second-side stepping motor 24M, so as to change, based on the position of the valve disk, a ratio between a flow rate of the fluid flowing from the second-side first port 24A to the second-side third port 24C and a flow rate of the fluid flowing from the second-side second port 24B to the second-side third port 24C.

A second-side tank 26 is located in the second-side flow path 23 at a position that is downstream of the second-side three-way valve 24 and upstream of the temperature control position by the second-side temperature control unit 22. The second-side tank 26 also constitutes a part of the second-side flow path 23. The second-side tank 26 stores a certain amount of fluid that is a liquid. A second-side pump 27 that imparts a driving force for circulating the fluid through the second-side flow path 23 is located in the second-side tank 26. When an operation of the temperature-controlled fluid circulation system S1 is started, the second-side pump 27 is also driven by a constant driving force.

In addition, the second temperature-controlled fluid circulation apparatus 20 comprises a second-side pressure sensor 29P. The second-side pressure sensor 29P is electrically connected to a controller 100. The second-side pressure sensor 29P detects a pressure of the fluid flowing through the second-side flow path 23 at a poison that is downstream of the valve unit 50 and upstream of the second-side three-way valve 24.

In the aforementioned first temperature-controlled fluid circulation apparatus 10 and the second temperature-controlled fluid circulation apparatus 20 in this embodiment, fluids circulated by them are liquids that are the same with each other. A liquid storage position of the first-side tank 16 and a liquid storage position of the second-side tank 26 are connected to each other by a pipe member 30. A liquid level storage position is a position below a liquid level when a certain amount of liquid is stored in the tank. An amount of liquid to be stored in the tank is predetermined.

The pipe member 30 allows a liquid to flow between the first-side tank 16 and the second-side tank 26. Thus, a liquid level of the liquid in the first-side tank 16 and a liquid level of the liquid in the second-side tank 26 can be equalized, so that pressures of the liquids stored in the respective tanks can be equalized. In this embodiment, the valve unit 50 allows the liquid from the first temperature fluid controlled circulation 10 and the liquid from the second temperature fluid controlled circulation 20 to be mixed with each other and to be supplied to the temperature control target T. Since the pressures of the liquids are equalized by the pipe member 30, it is easy to control a temperature of the mixed liquid to a desired temperature.

Next, the valve unit 50 is described. The valve unit 50 is configured to send, to the temperature control target T, the fluid received from the first temperature-controlled fluid circulation apparatus 10, the fluid received from the temperature-controlled fluid circulation apparatus 20, or the mixed fluid of the fluid received from the first temperature-controlled fluid circulation apparatus 10 and the fluid received from the second temperature-controlled fluid circulation apparatus 20, and is configured to return the fluid having passed through the temperature control target T to the first-side flow path 13 or/and the second-side flow path 23.

The valve unit 50 in this embodiment comprises a valve-unit-side supply three-way valve 51 and a valve-unit-side return three-way valve 52. The valve-unit-side supply three-way valve 51 includes a first reception port 51A, a second reception port 51B, and a supply port 51C. The first reception port 51A is connected to the downstream end 13D of the first-side flow path 13 of the first temperature-controlled fluid circulation apparatus 10. The second reception port 51B is connected to the downstream end 23D of the second-side flow path 23 of the second temperature-controlled fluid circulation apparatus 20. The supply port 51C is connected to the temperature control target T through a flow path.

The valve-unit-side supply three-way valve 51 is a proportional three-way valve, and has a stepping motor 51M serving as an actuator for driving a valve disk. The valve-unit-side supply three-way valve 51 can adjust a position of the valve disk, not shown, by the stepping motor 51M, so as to change, based on the position of the valve disk, a mixed ratio between the fluid from the first temperature-controlled fluid circulation apparatus 10, which is received through the first reception port 51A, and the fluid from the second temperature-controlled fluid circulation apparatus 20, which is received through the second reception port 51B, and can cause the mixed fluid to flow out from the supply port 51C.

On the other hand, the valve-unit-side return three-way valve 52 includes a return port 52A, a first distribution port 52B, and a second distribution port 52C. The return port 52A is connected to the temperature control target T through a flow path. The first distribution port 52B is connected to the upstream end 13U of the first-side flow path 13 of the first temperature-controlled fluid circulation apparatus 10. The second distribution port 52C is connected to the upstream end 23U of the second-side flow path 23 of the second temperature-controlled fluid circulation apparatus 20.

The valve-unit-side return three-way valve 52 is also a proportional three-way valve, and has a stepping motor 52M serving as an actuator for driving a valve disk. The valve-unit-side return three-way valve 52 can adjust a position of the valve disk, not shown, by the stepping motor 52M, so as to return the fluid received through the return port 52A to the first temperature-controlled fluid circulation apparatus 10 and to the second temperature-controlled fluid circulation apparatus 20 at a predetermined ratio therebetween.

In this embodiment, the valve-unit-side supply three-way valve 51 and the valve-unit-side return three-way valve 52 are of the same type and of the same size. Opening degrees of the valve-unit-side supply three-way valve 51 and the valve-unit-side return three-way valve 52 are controlled by the controller 100. Specifically, the valve-unit-side supply three-way valve 51 and the valve-unit-side return three-way valve 52 are controlled by the controller 100 to have opening degrees that are the same with each other.

The temperature-controlled fluid circulation system S1 in this embodiment further comprises a valve-unit-side pressure sensor 54 that detects a pressure of the fluid in the valve-unit-side supply three-way valve 51, specifically, a pressure of the fluid flowing out from the supply port 51C, and a temperature sensor 55 that detects a temperature of the temperature control target T. The controller 100 is configured to receive information related to the fluid from the first-side pressure sensor 19P, the second-side pressure sensor 29P, and the valve-unit-side pressure sensor 54, and to receive information related to a temperature of the temperature control target T from the temperature sensor 55.

The controller 100 in this embodiment is described herebelow. The controller 100 controls an opening degree of the first-side three-way valve 14 in such a manner that the pressure of the fluid, which is detected by the first-side pressure sensor 19P, becomes a specified first-side target pressure, and controls an opening degree of the second-side three-way valve 24 in such a manner that the pressure of the fluid, which is detected by the second-side pressure sensor 29P, becomes a specified second-side target pressure. The above respective target pressures are inputted to the controller 100 by a user.

In more detail, the controller 100 in this embodiment is configured to perform feedback control of an opening degree of the first-side three-way valve 14 in such a manner that the pressure of the fluid, which is detected by the first-side pressure sensor 19P, becomes the specified first-side target pressure, based on a difference between the pressure of the fluid, which is detected by the first-side pressure sensor 19P, and the first-side target pressure. And, the controller 100 is configured to perform feedback control of an opening degree of the second-side three-way valve 24 in such a manner that the pressure of the fluid, which is detected by the second-side pressure sensor 29P, becomes the specified second-side target pressure, based on a difference between the pressure of the fluid, which is detected by the second-side pressure sensor 29P, and the second-side target pressure. Further, the controller 100 is configured to perform feed-forward control of the respective opening degrees of the first-side three-way valve 14 and the second-side three-way valve 24, based on information of the pressure of the fluid from the valve-unit-side pressure sensor 54.

The aforementioned feed-forward control is performed when an absolute value of a rate of change in pressure in the valve-unit-side supply three-way valve 51 is determined to become a threshold value or more, based on the information from the valve-unit-side pressure sensor 54. The feed-forward control changes the opening degrees of the first-side three-way valve 14 and the second-side three-way valve 24 with a manipulated variable corresponding to a magnitude of the absolute value of the rate of change.

In more detail, when an absolute value of the rate of change in pressure in the valve-unit-side supply three-way valve 51 becomes an increase side threshold value or more, the opening degree of the first-side three-way valve 14 is changed with a manipulated variable corresponding to a magnitude of the absolute value of the rate of change in such a manner that the opening degree between the first-side first port 14A and the first-side third port 14C increases, and the opening degree of the second-side three-way valve 24 is changed with a manipulated variable corresponding to a magnitude of the absolute value of the rate of change in such a manner that the opening degree between the second-side first port 24A and the second-side third port 24C increases.

On the other hand, when an absolute value of the rate of change in pressure in the valve-unit-side supply three-way valve 51 becomes a decrease side threshold value or more, the opening degree of the first-side three-way valve 14 is changed with a manipulated variable corresponding to a magnitude of the absolute value of the rate of change in such a manner that the opening degree between the first-side first port 14A and the first-side third port 14C decreases, and the opening degree of the second-side three-way valve 24 is changed with a manipulated variable corresponding to a magnitude of the absolute value of the rate of change in such a manner that the opening degree between the second-side first port 24A and the second-side third port 24C decreases.

The aforementioned rate of change in pressure means an amount of change of pressure per unit time. The rate of change in pressure is sequentially calculated by calculating a moving average value of pressure for each unit time, and by dividing a difference between the moving average value of the latest pressure and the moving average value of pressure calculated one time before by the unit time. A time range for calculating the moving average value may be a time range that is a unit time back from a timing for calculating a rate of change, for example. It is desirable for the valve-unit-side pressure sensor 54 to detect at least five pressures within a time range during which the moving average value is calculated.

Figure 4:
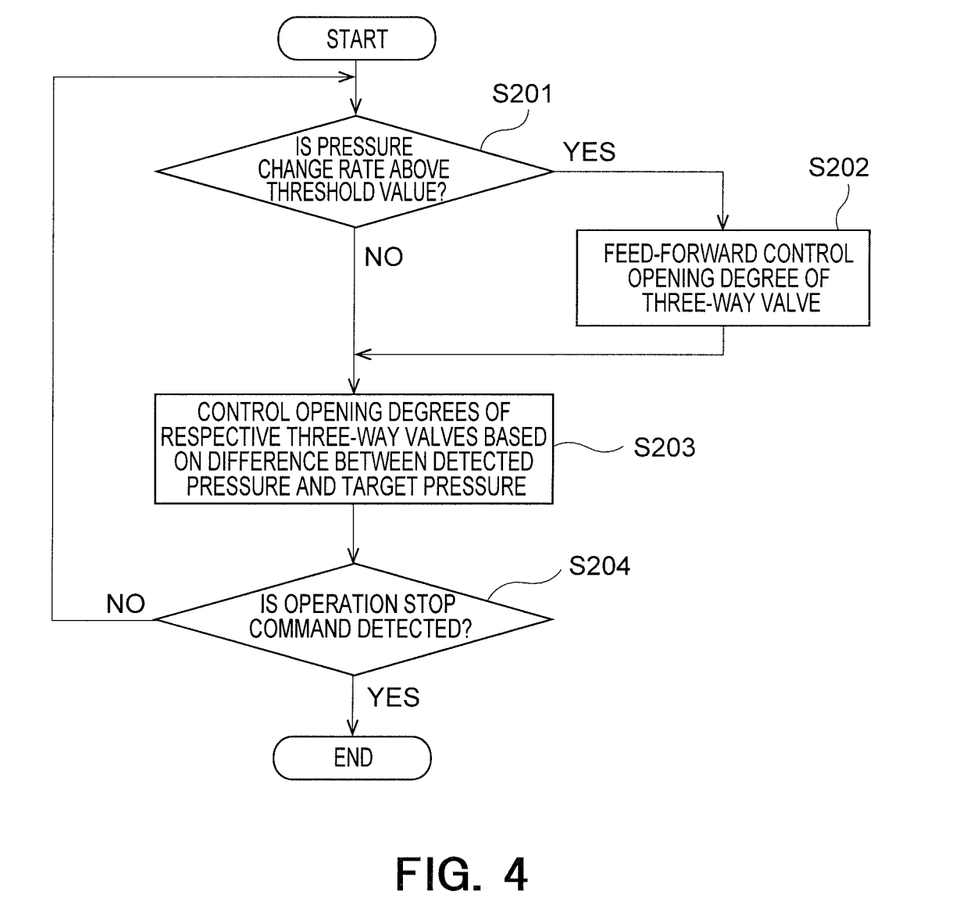
FIG. 4 is a flowchart describing an example of an operation of the temperature-controlled fluid circulation system according to the second embodiment.

FIG. 4 is flowchart showing an example of an operation of the temperature-controlled fluid circulation system S1. The example of the operation of the temperature-controlled fluid circulation system S1 is described herebelow with reference to FIG. 4.

The example described herein is started, for example, after the operation of the temperature-controlled fluid circulation system S1 had been started so that a temperature of the temperature control target T reached a target temperature. At this time, the first-side three-way valve 14 and the second-side three-way valve 24 are controlled to predetermined standard opening degrees. Each standard opening degree is an intermediate opening degree between full close and full open. For example, when the temperature sensor 55 detects that the temperature of the temperature control target T has reached the target temperature, the controller 100 first checks, in a step 201, whether an absolute value of a rate of change in pressure (pressure change rate herebelow) in the valve-unit-side supply three-way valve 51 becomes a threshold value or more, based on information from the valve-unit-side pressure sensor 54.

When the step S201 determines that the absolute value of the pressure change rate becomes the threshold value or more, the controller 100 changes, in a step S202, the opening degrees of the first-side three-way valve 14 and the second-side three-way valve 24 with a manipulated variable corresponding to a magnitude of the absolute value of the pressure change rate. Thereafter, the controller 100 causes the process to proceed to a step S203. On the other hand, when the step S201 does not determine that the absolute value of the pressure change rate becomes the threshold value or more, the process proceeds to the step S203.

In the step S203, the controller 100 performs feedback control of the opening degree of the first-side three-way valve 14 based on a difference between a pressure of the fluid, which is detected by the first-side pressure sensor 19P, and a first-side target pressure, in such a manner that the pressure of the fluid, which is detected by the first-side pressure sensor 19P, becomes the specified first target pressure. And, the controller 100 performs feedback control of the opening degree of the second-side three-way valve 24 based on a difference between a pressure of the fluid, which is detected by the second-side pressure sensor 29P, and a second-side target pressure, in such a manner that the pressure of the fluid, which is detected by the second-side pressure sensor 29P, becomes the specified second target pressure.

Then, in a step S204, the controller 100 detects whether an operation stop command is generated. When the operation stop command is detected, the controller 100 stops the operation of the temperature-controlled fluid circulation system S1. When the operation stop command is not detected, the controller 100 causes the process to return to the step S201.

In the aforementioned second embodiment, a pressure of the fluid flowing out from the temperature control target T to return to the first-side flow path 13 and/or the second-side flow path 23 can be maintained at a desired value. This can improve the precision in temperature control by the fluid by improving the stability of a circulation condition of the fluid in the first-side flow path 13 and/or the second-side flow path 23.

In particular, combination of the feedback control to a target pressure based on the first-side pressure sensor 19P and the second-side pressure sensor 29P, and the feed-forward control based on a rate of change in pressure of the fluid by the valve unit 50 can improve the reliability and the rapidity of control to the target pressure.

In the second embodiment, the feed-forward control is performed based on the information of the pressure detected by the valve-unit-side pressure sensor 54. However, in place thereof, feed-forward control may be performed based on an absolute value of a rate of change in load of the stepping motor 51M of the valve-unit-side supply three-way valve 51. Namely, the controller 100 may be configured to receive information related to a load of the stepping motor 51M which is an actuator that imparts a driving force to the valve disk. In this case, when the controller 100 determines that an absolute value of a rate of change in load of the stepping motor 51M becomes a threshold value or more based on the received information related to the load, the controller 100 may perform feed-forward control that changes an opening degree of the first-side three-way valve 14 and an opening degree of the second-side three-way valve 24 with a manipulated variable corresponding to a magnitude of the absolute value of the rate of change. In this case, the feed-forward control can be performed by a process inside the controller 100, which is advantageous in terms of simplification and processing speed.

Third Embodiment

Figure 5:
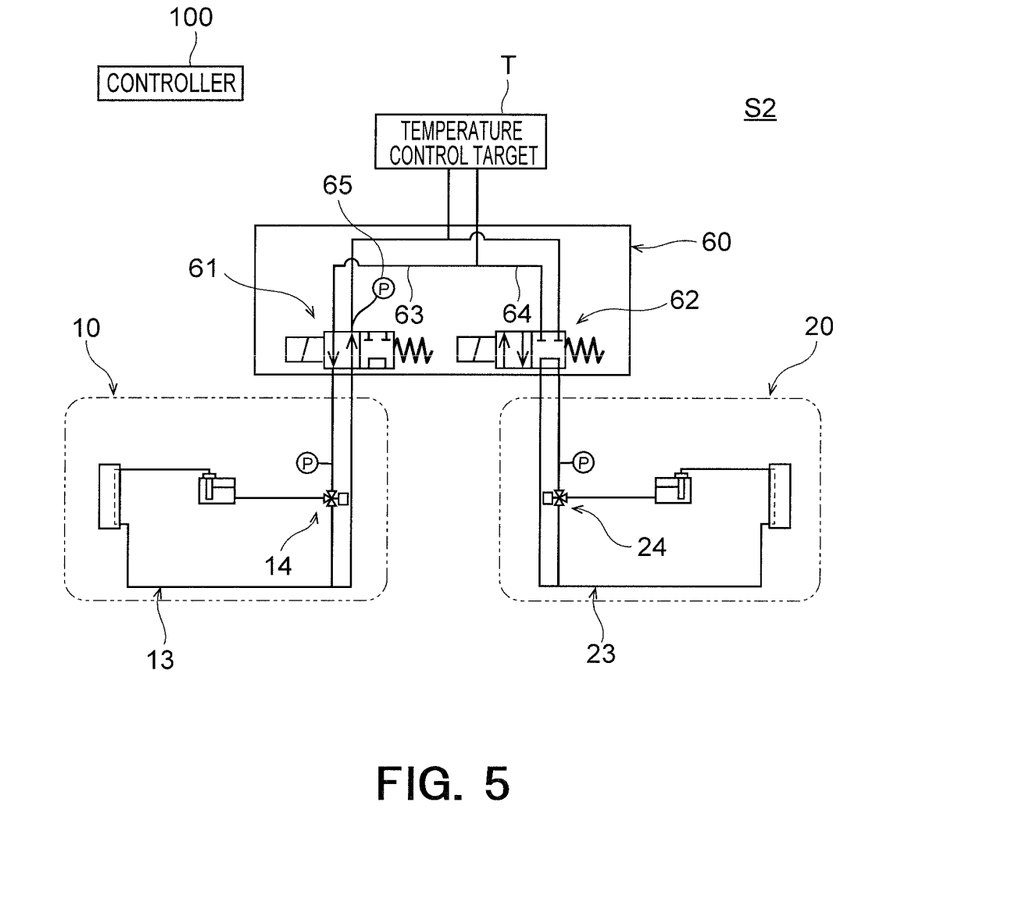
FIG. 5 is a view showing a schematic structure of a temperature-controlled fluid circulation system according to a third embodiment of the present invention.

Next, a temperature-controlled fluid circulation system S2 according to a third embodiment is described. FIG. 5 is a schematic view of the temperature-controlled fluid circulation system S2. The same symbols are given to parts of this embodiment that are similar to those of the first and second embodiments. In this embodiment, a valve unit 60 has a structure different from the structure of the valve unit 50 described in the second embodiment.

The valve unit 60 has a first spool valve 61 that switches flow and shutoff of a fluid from a first temperature-controlled fluid circulation apparatus 10 to a temperature control target T, and a second spool valve 62 that switches flow and shutoff of a fluid from a second temperature-controlled fluid circulation apparatus 20 to the temperature control target T. The first spool valve 61 is a proportional spool valve, and is configured to switch flow and shutoff of the fluid from the first temperature-controlled fluid circulation apparatus 10 to the temperature control target T, allowing a flow rate of the fluid flowing from the first temperature-controlled fluid circulation apparatus 10 to the temperature control target T to be adjusted. Similarly, the second spool valve 62 is a proportional spool valve, and is configured to switch flow and shutoff of the fluid from the second temperature-controlled fluid circulation apparatus 20 to the temperature control target T, allowing a flow rate of the fluid flowing from the second temperature-controlled fluid circulation apparatus 20 to the temperature control target T to be adjusted.

A first circulation flow path 63 and a second circulation flow path 64 branch and extend from the temperature control target T. The first circulation flow path 63 is connected to the first spool valve 61, and the second circulation flow path 64 is connected to the second spool valve 62. Thus, the fluid flowing out from the temperature control target T can flow into the first spool valve 61 through the first circulation flow path 63, and can flow into the second spool valve 62 through the second circulation flow path 64.

The first spool valve 61 has s a port for returning the fluid from the first circulation flow path 63 to the first temperature-controlled fluid circulation apparatus 10, and is configured to adjust a flow rate of the fluid that returns from the first circulation flow path 63 to the first temperature-controlled fluid circulation apparatus 10, in conjunction with the adjustment of the flow rate of the fluid flowing from the first temperature-controlled fluid circulation apparatus 10 to the temperature control target T. Similarly, the second spool valve 62 has a port for returning the fluid from the second circulation flow path 64 to the second temperature-controlled fluid circulation apparatus 20, and is configured to adjust a flow rate of the fluid that returns from the second circulation flow path 64 to the second temperature-controlled fluid circulation apparatus 20, in conjunction with the adjustment of the flow rate of the fluid flowing from the second temperature-controlled fluid circulation apparatus 20 to the temperature control target T.

In this embodiment, a first in-spool pressure sensor 65 is provided to detect a pressure of the fluid in the first spool valve 61, specifically, a pressure of the fluid in the port from which the fluid flows out toward the temperature control target T. The controller 100 is configured to receive information related to the pressure of the fluid in the first spool valve 61 from the first in-spool pressure sensor 65. When the controller 100 determines that an absolute value of a rate of change in pressure of the fluid in the first spool valve 61 becomes a threshold value or more based on the received information, the controller 100 is configured to perform feed-forward control that changes an opening degree of the first-side three-way valve 14 and an opening degree of the second-side three-way valve 24 with a manipulated variable corresponding to a magnitude of the absolute value of the rate of change. The feed-forward control is similar to that of the second embodiment.

The aforementioned third embodiment can provide an effect similar to the second embodiment. In the third embodiment, the first in-spool pressure sensor 65 detects a pressure of the fluid in the port of the first spool valve 61. However, the first in-spool pressure sensor 65 may detect a pressure of the fluid which has flown out from the port of the first spool valve 61 and has not yet flown into the temperature control target T. The pressure sensor may be provided on the second spool valve 62.

In this embodiment, the feed-forward control is performed based on the information of the pressure detected by the first in-spool pressure sensor 65. However, in place thereof, feed-forward control may be performed based on a rate of change in load of a solenoid that drives the first spool valve 61. Namely, the controller 100 may be configured to receive information related to a load of the solenoid which is an actuator that imparts a driving force to the valve disk. In this case, when the controller 100 determines that an absolute value of a rate of change in load of the solenoid becomes a threshold value or more based on the received information related to the load, the controller 100 may perform feed-forward control that changes an opening degree of the first-side three-way valve 14 and an opening degree of the second-side three-way valve 24 with a manipulated variable corresponding to a magnitude of the absolute value of the rate of change.

The respective embodiments have been described above, but the present invention is not limited to the aforementioned embodiments, and the aforementioned embodiments can be variously modified. Such a modified embodiment is included in the scope of the present invention. For example, in FIG. 5, the first spool valve 61 and the second spool valve 62 are separated from each other. However, the first spool valve 61 and the second spool valve 62 may be integrated to each other to have a common spool.

What is claimed is:

1. A temperature-controlled fluid circulation apparatus comprising:
   a flow path through which a fluid whose temperature has been controlled by a temperature control unit is circulated via a fluid supply target;
   a three-way valve located in the flow path at a position that is downstream of the fluid supply target and upstream of a temperature control position by the temperature control unit, a part between two ports out of three ports constituting a part of the flow path;
   a bypass flow path branching from the flow path at a position that is downstream of the temperature control position by the temperature control unit and upstream of the fluid supply target, to be connected to one remaining port out of the three ports of the three-way valve, the one remaining port being other than the two ports that constitute the part of the flow path;
   a pressure sensor that detects a pressure of the fluid flowing through the flow path at a position that is downstream of the fluid supply target and upstream of the three-way valve; and
   a controller that controls the three-way valve;
   wherein the controller controls an opening degree of the three-way valve in such a manner that the pressure of the fluid, which is detected by the pressure sensor, becomes a specified target pressure, and
   wherein the controller is configured to receive information related to a temperature of the fluid supply target, and when the controller determines, based on the information, that an absolute value of a rate of change in temperature of the fluid supply target becomes a threshold value or more, the controller performs feed-forward control that changes an opening degree of the three-way valve with a manipulated variable corresponding to a magnitude of the absolute value of the rate of change.

2. The temperature-controlled fluid circulation apparatus according to claim 1, comprising a pump that imparts a driving force for circulating the fluid through the flow path, wherein the pump is driven by a constant driving force.

3. The temperature-controlled fluid circulation apparatus according to claim 1, wherein:

the fluid is a liquid; and
the temperature-controlled fluid circulation apparatus further comprises:
   a tank located in the flow path at a position that is downstream of the three-way valve and upstream of the temperature control position by the temperature control unit, the tank constituting a part of the flow path; and
   a liquid-level maintenance mechanism that maintains constant a liquid level of a liquid stored in the tank.

4. A temperature-controlled fluid circulation system comprising:
   a valve unit;
   a first temperature-controlled fluid circulation apparatus comprising: a first-side flow path through which a fluid whose temperature has been controlled by a first-side temperature control unit is circulated via the valve unit; a first-side three-way valve located in the first-side flow path at a position that is downstream of the valve unit and upstream of a temperature control position by the first-side temperature control unit, a part between two ports out of three ports constituting a part of the first-side flow path; a first-side bypass flow path branching from the first-side flow path at a position that is downstream of the temperature control position by the first-side temperature control unit and upstream of the valve unit, to be connected to one remaining port out of the three ports of the first-side three-way valve, the one remaining port being other than the two ports that constitute a part of the first-side flow path; and a first-side pressure sensor that detects a pressure of the fluid flowing through the first-side flow path at a position that is downstream of the valve unit and upstream of the first-side three-way valve;
   a second temperature-controlled fluid circulation apparatus comprising: a second-side flow path through which a fluid whose temperature has been controlled by a second-side temperature control unit is circulated via the valve unit; a second-side three-way valve located in the second-side flow path at a position that is downstream of the valve unit and upstream of a temperature control position by the second-side temperature control unit, a part between two ports out of three ports constituting a part of the second-side flow path; a second-side bypass flow path branching from the second-side flow path at a position that is downstream of the temperature control position by the second-side temperature control unit and upstream of the valve unit, to be connected to one remaining port out of the three ports of the second-side three-way valve, the one remaining port being other than the two ports that constitute a part of the second-side flow path; and a second-side pressure sensor that detects a pressure of the fluid flowing through the second-side flow path at a position that is downstream of the valve unit and upstream of the second-side three-way valve; and
   a controller that controls the first-side three-way valve and the second-side three-way valve;
   wherein:
   the valve unit is configured to send, to a temperature control target, the fluid received from the first temperature-controlled fluid circulation apparatus, the fluid received from the second temperature-controlled fluid circulation apparatus, or the mixed fluid of the fluid received from the first temperature-controlled fluid circulation apparatus and the fluid received from the second temperature-controlled fluid circulation apparatus, and is configured to return the fluid having passed through the temperature control target to the first-side flow path or/and the second-side flow path; and the controller controls an opening degree of the first-side three-way valve in such a manner that the pressure of the fluid, which is detected by the first-side pressure sensor, becomes a specified first-side target pressure, and controls an opening degree of the second-side three-way valve in such a manner that the pressure of the fluid, which is detected by the second-side pressure sensor, becomes a specified second-side target pressure.

5. The temperature-controlled fluid circulation system according to claim 4, wherein:

the fluid circulated by the first temperature-controlled fluid circulation apparatus and the fluid circulated by the second temperature-controlled fluid circulation apparatus are liquids that are the same with each other;

the first temperature-controlled fluid circulation apparatus comprises a first-side tank located in the first-side flow path at a position that is downstream of the first-side three-way valve and upstream of the temperature control position by the first-side temperature control unit, the first-side tank constituting a part of the first-side flow path;

the second temperature-controlled fluid circulation apparatus comprises a second-side tank located in the second-side flow path at a position that is downstream of the second-side three-way valve and upstream of the temperature control position by the second-side temperature control unit, the second-side tank constituting a part of the second-side flow path; and a liquid storage position of the first-side tank and a liquid storage position of the second-side tank are connected to each other by a pipe member.

6. The temperature-controlled fluid circulation system according to claim 4, wherein:

the valve unit has a valve-unit-side three-way valve including a first reception port, a second reception port, and a supply port;

the valve-unit-side three-way valve is capable of changing, depending on a position of a valve disk, a mixing ratio of the fluid received by the first reception port from the first temperature-controlled fluid circulation apparatus and the fluid received by the second reception port from the second temperature-controlled fluid circulation apparatus, and capable of causing them to flow out from the supply port; and the controller is configured to receive information related to a pressure of the fluid in the valve-unit-side three-way valve, and when the controller determines, based on the information, that an absolute value of a rate of change in pressure of the fluid in the valve-unit-side three-way valve becomes a threshold value or more, the controller performs feed-forward control that changes an opening degree of the first-side three-way valve and an opening degree of the second-side three-way valve with a manipulated variable corresponding to a magnitude of the absolute value of the rate of change.

7. The temperature-controlled fluid circulation system according to claim 4, wherein:

the valve unit has a valve-unit-side three-way valve including a first reception port, a second reception port, and a supply port;

the valve-unit-side three-way valve is capable of changing, depending on a position of a valve disk, a mixing ratio of the fluid received by the first reception port from the first temperature-controlled fluid circulation apparatus and the fluid received by the second reception port from the second temperature-controlled fluid circulation apparatus, and capable of causing them to flow out from the supply port; and the controller is configured to receive information related to a load of an actuator that imparts a driving force to the valve disk, and when the controller determines, based on the information, that an absolute value of a rate of change in load of the actuator becomes a threshold value or more, the controller performs feed-forward control that changes an opening degree of the first-side three-way valve and an opening degree of the second-side three-way valve with a manipulated variable corresponding to a magnitude of the absolute value of the rate of change.

8. The temperature-controlled fluid circulation system according to claim 4, wherein:

the valve unit has a spool valve capable of changing, depending on a position of a spool, a mixing ratio of the fluid received from the first temperature-controlled fluid circulation apparatus and the fluid received from the second temperature-controlled fluid circulation apparatus, and capable of causing them to flow toward the temperature control target; and the controller is configured to receive information related to a pressure of the fluid in the spool valve or the fluid flowing from the spool valve into the temperature control target, and when the controller determines, based on the information, that an absolute value of a rate of change in pressure of the fluid in the spool valve becomes a threshold value or more, the controller performs feed-forward control that changes an opening degree of the first-side three-way valve and an opening degree of the second-side three-way valve with a manipulated variable corresponding to a magnitude of the absolute value of the rate of change.

9. The temperature-controlled fluid circulation system according to claim 4, wherein:

the valve unit has a spool valve capable of changing, depending on a position of a spool, a mixing ratio of the fluid received from the first temperature-controlled fluid circulation apparatus and the fluid received from the second temperature-controlled fluid circulation apparatus, and capable of causing them to flow toward the temperature control target; and the controller is configured to receive information related to a load of an actuator that imparts a driving force to the spool, and when the controller determines, based on the information, that an absolute value of a rate of change in load of the actuator becomes a threshold value or more, the controller performs feed-forward control that changes an opening degree of the first-side three-way valve and an opening degree of the second-side three-way valve with a manipulated variable corresponding to a magnitude of the absolute value of the rate of change.

10. The temperature-controlled fluid circulation system according to claim 5, wherein:

the valve unit has a valve-unit-side three-way valve including a first reception port, a second reception port, and a supply port;

the valve-unit-side three-way valve is capable of changing, depending on a position of a valve disk, a mixing ratio of the fluid received by the first reception port from the first temperature-controlled fluid circulation apparatus and the fluid received by the second reception port from the second temperature-controlled fluid circulation apparatus, and capable of causing them to flow out from the supply port; and the controller is configured to receive information related to a load of an actuator that imparts a driving force to the valve disk, and when the controller determines, based on the information, that an absolute value of a rate of change in load of the actuator becomes a threshold value or more, the controller performs feed-forward control that changes an opening degree of the first-side three-way valve and an opening degree of the second-side three-way valve with a manipulated variable corresponding to a magnitude of the absolute value of the rate of change.

11. The temperature-controlled fluid circulation system according to claim 5, wherein:

the valve unit has a spool valve capable of changing, depending on a position of a spool, a mixing ratio of the fluid received from the first temperature-controlled fluid circulation apparatus and the fluid received from the second temperature-controlled fluid circulation apparatus, and capable of causing them to flow toward the temperature control target; and the controller is configured to receive information related to a pressure of the fluid in the spool valve or the fluid flowing from the spool valve into the temperature control target, and when the controller determines, based on the information, that an absolute value of a rate of change in pressure of the fluid in the spool valve becomes a threshold value or more, the controller performs feed-forward control that changes an opening degree of the first-side three-way valve and an opening degree of the second-side three-way valve with a manipulated variable corresponding to a magnitude of the absolute value of the rate of change.

12. The temperature-controlled fluid circulation system according to claim 5, wherein:

the valve unit has a spool valve capable of changing, depending on a position of a spool, a mixing ratio of the fluid received from the first temperature-controlled fluid circulation apparatus and the fluid received from the second temperature-controlled fluid circulation apparatus, and capable of causing them to flow toward the temperature control target; and the controller is configured to receive information related to a load of an actuator that imparts a driving force to the spool, and when the controller determines, based on the information, that an absolute value of a rate of change in load of the actuator becomes a threshold value or more, the controller performs feed-forward control that changes an opening degree of the first-side three-way valve and an opening degree of the second-side three-way valve with a manipulated variable corresponding to a magnitude of the absolute value of the rate of change.

* * * * *